Figure 1:
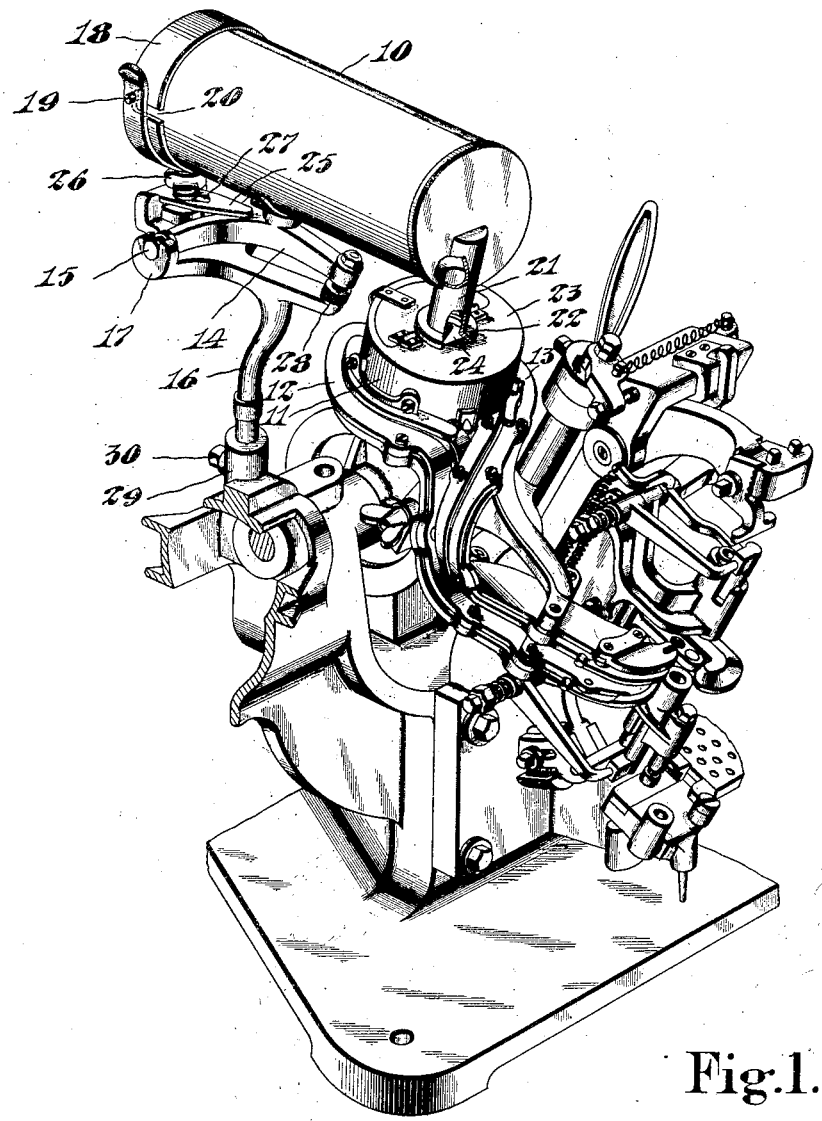

Oct. 21, 1924.　　　　　　　　　　　　　　　　1,512,045
F. A. RUMNEY
FASTENER SUPPLYING RESERVOIR
Filed Nov. 5, 1920

INVENTOR
Fred A. Rumney.

Patented Oct. 21, 1924.

1,512,045

UNITED STATES PATENT OFFICE.

FRED A. RUMNEY, OF BOSTON, MASSACHUSETTS, ASSIGNOR TO UNITED SHOE MACHINERY CORPORATION, OF PATERSON, NEW JERSEY, A CORPORATION OF NEW JERSEY.

FASTENER-SUPPLYING RESERVOIR.

Application filed November 5, 1920. Serial No. 421,906.

*To all whom it may concern:*

Be it known that I, FRED A. RUMNEY, a citizen of the United States, residing at Boston, in the county of Suffolk and State of Massachusetts, have invented certain Improvements in Fastener-Supplying Reservoirs, of which the following description, in connection with the accompanying drawings, is a specification, like reference characters on the drawings indicating like parts in the several figures.

This invention relates to reservoirs from which articles are supplied by gravitation for one purpose or another, but more especially it relates to reservoirs by which fasteners are supplied to some mechanism by which they are to be controlled or handled. For example, fastener-setting machines are usually provided with a hopper and also with one or more raceways for conducting the fasteners from the hopper to the setting mechanism. In the case of a combination comprising a hopper and a raceway one function of the hopper is to segregate fasteners from a mass according to their positions so that only those that occupy one or more certain predetermined positions will pass from the hopper into the raceway or raceways. For various reasons it is preferable to restrict the size of the hopper and also the contents thereof. For example, in many machines of the character stated the hoppers as well as the raceways are obliged to execute reciprocatory motion so that they may function, but if the weight of the hopper or its contents or both is unduly great the machine will be subject to excessive vibration in consequence of reciprocating the elements in question. Again, if the number and weight of fasteners in the hopper are relatively great the fasteners in the mass will interfere to a great extent with the discharge of those that would otherwise pass from the hopper to the raceway.

On the other hand, it is desirable, especially in machines that set or otherwise dispose of large numbers of fasteners, to provide for storing a relatively large number at one time so that replenishment of the available supply will not be required at too frequent intervals.

Accordingly an object of this invention is to provide improved means for storing a relatively large reserve supply of fasteners in such manner as not to interfere with their progress toward the ultimate point of delivery or damage the fasteners, nor to impose an excessive load on the mechanism or any moving element of the machine with which the storing means is associated. An example of the conditions under consideration is shown by United States Letters Patent 1,146,024 granted July 13, 1915, on an application filed by me, said patent illustrating a hopper for containing a limited supply of fasteners, raceways arranged to receive fasteners from the hopper, and a reservoir adapted to contain a relatively large supply of fasteners and arranged to discharge the latter into the hopper at a rate commensurate with that at which the fasteners pass from the hopper into the raceways. The patented construction accomplishes the desired result in a satisfactory manner excepting that when the fasteners are made of relatively thin and relatively soft metal, such as eyelets used in the manufacture of corsets, some of the eyelets become indented, with the result that they sometimes fail to respond accurately to the operation of the setting tools. It has been found that such indenting is due in part to arranging the spout or mouth of the reservoir in the interior of the hopper, and is also due in part to the back-pressure, as it were, of the eyelets when the raceways are fully charged. Under the latter condition the vibration of the machine agitates the eyelets in the reservoir so that they continue to gravitate into the hopper notwithstanding an excess of eyelets already in the hopper, such eyelets being thereby caused to accumulate under the spout of the reservoir so that the spout is lifted by them. Since the downward pressure of the spout is then sustained by the eyelets some of the latter become indented, their hardship being aggravated by the movable feeder or agitator in the hopper.

More specifically an object of the present invention is to provide means for supplying fasteners substantially as aforesaid but without subjecting them to any action that would indent or otherwise distort them, to the end that the fasteners, even those made of thin and soft metal, will be preserved and delivered to the setting mechanism in perfect condition.

According to the present invention the discharge mouth of the reservoir remains outside the hopper but in a relation so close to the latter, if not in actual contact therewith, that the fasteners passing into the hopper as well as those that have already entered will have no opportunity to escape through the fastener-receiving port. Preferably the fastener-receiving port of the hopper is formed in a flat wall while the reservoir is preferably provided with a discharging spout having a flat annular flange surrounding its mouth and arranged in abutting relation to the rim of the aforesaid port. This construction enables an external surface of the hopper to sustain the downward pressure of the spout of the reservoir and at the same time enables the aforesaid flange to cover or close the receiving port of the hopper so as to prevent the escape of eyelets even though the center of the spout may be offset from that of the receiving port.

Other features of the invention are hereinafter described and claimed and are illustrated by the accompanying drawings. Referring to the latter, Fig. 1 is a perspective view of a portion of a well-known type of duplex eyeleting machine equipped with a hopper and a reservoir embodying the present invention in what I now regard as the preferred form, and Fig. 2 is a section in a vertical plane including the contiguous portions of the raceway and hopper through which the fasteners are supplied.

Figure 2:
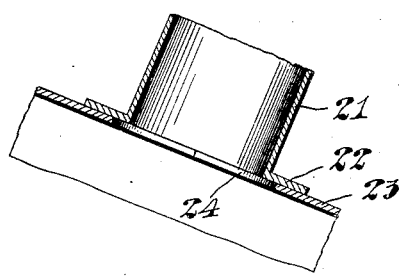

The eyeleting machine shown by Fig. 1 is of the same general type as that disclosed in Letters Patent of the United States No. 1,423,626, granted July 25, 1922, on application of Walter Shaw, and is organized to set two series of eyelets simultaneously in two elements of work such as the component parts of a pair of corsets.

A fastener-supplying reservoir is indicated at 10 and a hopper to which it supplies fasteners is indicated at 11. Since the illustrated machine is one of a so-called "duplex" type the hopper is provided with two raceways 12, 13 each of which conducts a course of fasteners to the setting mechanism. Inasmuch as the details of the setting mechanism are not important for the purpose of this application it will not be necessary to describe them.

The reservoir 10 is affixed to a spider 14 having two trunnions one of which is indicated at 15, a bracket 16 affixed to the machine being provided with portions adapted to receive the trunnions 15 so that the spider may be tilted. One of these trunnion-receiving portions is indicated at 17 and preferably at least one of them is open at the top so that the trunnion may be placed therein from above. The reservoir is further provided with a detachable cap or cover 18 and with one or more pins 19 for retaining the latter, the cap having one or more slots or notches 20 to receive the pins to form what is commonly known as a bayonet joint. The reservoir also includes a discharge spout 21 the mouth of which is preferably provided with a flat annular flange 22 extending outwardly therefrom and providing a plane surface adapted to bear on the top 23 of the hopper. The latter is provided with a fastener-receiving port 24 in registration with the mouth of the spout but preferably less in diameter than the outer edge of the flange 22 so that the flange will effectively close or cover the port whether the port and mouth are strictly concentric or slightly eccentric relatively to each other.

In a machine of the type illustrated the hopper and raceways constitute a movable unit which is arranged and operated to oscillate about an axis substantially coincidental with the center of the port 24, such oscillation being timed with reference to the setting mechanism so that the delivery ends of the raceways will present fasteners to the setting tools and then move away from the latter to avoid interference. Consequently, although the reservoir is mounted so as to remain stationary, excepting as it may be agitated by vibration of the machine, the conduit through which the fasteners pass from the reservoir to the hopper may be maintained substantially closed notwithstanding reciprocation of the hopper. The trunnions 15 are disposed so that the flange 22 of the discharge spout will be maintained in the desired position relatively to the hopper by the force of gravity, but as an additional safeguard to prevent separation in consequence of vibration or other factor the illustrated construction includes a leaf spring 25 arranged to act on the spider 14 so as to maintain an additional tendency on the part of the flange to bear on the hopper. The spring 25 is clamped to a portion of the bracket 16 by a wing bolt 26 and is provided with a slot 27 through which the shank of the bolt extends. This slot provides for retracting the spring and for swinging it away from the spider when the bolt is loosened, and facilitates the operation of mounting and demounting the reservoir. Whether the flange 22 actually touches the hopper or not depends upon whether the reservoir is otherwise supported so as to limit the tilting on the trunnions 15. The illustrated construction includes an adjustable stop screw 28 carried by the spider and arranged to bear on a portion of the bracket 16. This screw may be adjusted so as to permit the flange 22 to touch the hopper or, if desired, it may be adjusted so as to maintain a slight space between the flange and the hopper without, however, leaving an opening through which the fasteners could escape.

The illustrated construction is such that even though the raceways may be fully charged and the hopper filled with fasteners up to the level of the upper edge of the port 24 the fasteners, even those made of relatively thin and soft metal, will not be indented or otherwise injured. The flow of fasteners through the spout 21 will continue at a rate commensurate with that at which the fasteners are discharged from the raceways. In some cases it may be desirable to use a hopper of shallower depth than that shown, and in such case the bracket 16 may be adjusted vertically to compensate for such changes. Accordingly the stem or shank of the bracket is arranged in a fixture 29 having a set screw 30 arranged to engage the shank. In any case the adjustable screw 28 may serve to determine the angle of inclination at which the reservoir will stand excepting when such angle is determined by permitting the flange 22 to rest on the hopper.

Having thus described my invention, what I claim as new and desire to secure by Letters Patent of the United States is:

1. The combination with a hopper of a fastener-setting machine, which hopper has a fastener-receiving port, of a fastener-supplying reservoir pivotally mounted independently of the hopper and having a portion formed and arranged to cover said port, said portion having a passageway for discharging fasteners through said port, and a spring arranged to act on the reservoir so as to maintain said portion in cooperative relation to the hopper.

2. The combination with a fastener-setting machine having an oscillatory hopper provided with a flat surface the plane of which is transverse to the axis of oscillation, of a fastener-supplying reservoir arranged to discharge its contents into said hopper, said reservoir having a flat portion in face-to-face relation with said surface of the hopper, said flat portion and flat surface having, respectively, a discharge mouth and receiving port in register with each other, and means for maintaining said reservoir in the aforesaid relation to the hopper so that the oscillatory movements of the latter will not be transmitted to the reservoir.

3. The combination with a fastener-setting machine having an oscillatory hopper provided with a flat face the plane of which is transverse to the axis of oscillation, of a fastener-supplying reservoir arranged to discharge its contents into said hopper, said flat face having a receiving port in concentric relation to said axis and said reservoir having a flat portion arranged to bear on said flat face and having a discharge mouth in register with said port, and means for maintaining said reservoir in the aforesaid relation to said hopper so that the oscillatory movements of the latter will not be transmitted to the reservoir.

In testimony whereof I have signed my name to this specification.

FRED A. RUMNEY.